Patented July 26, 1927.

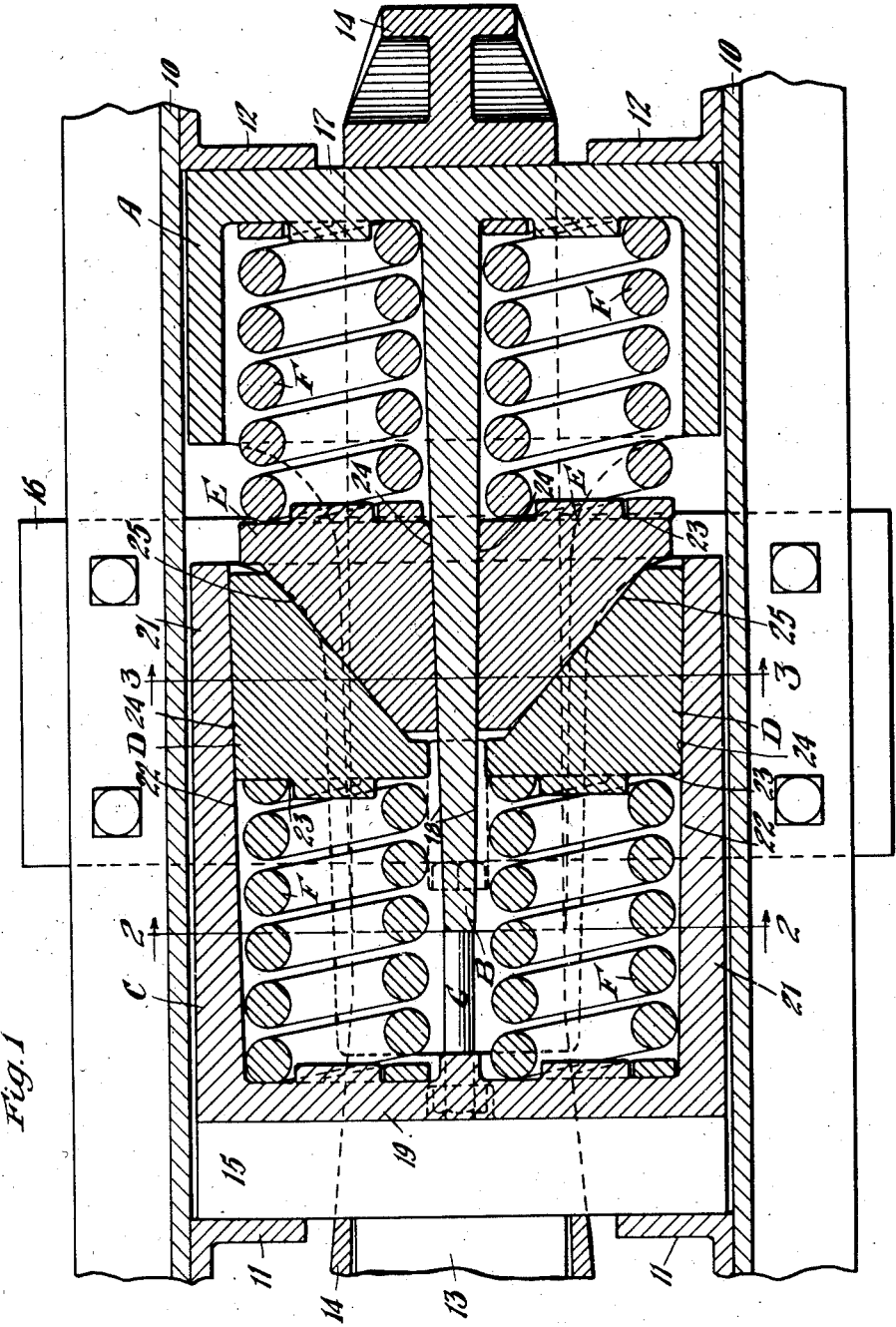

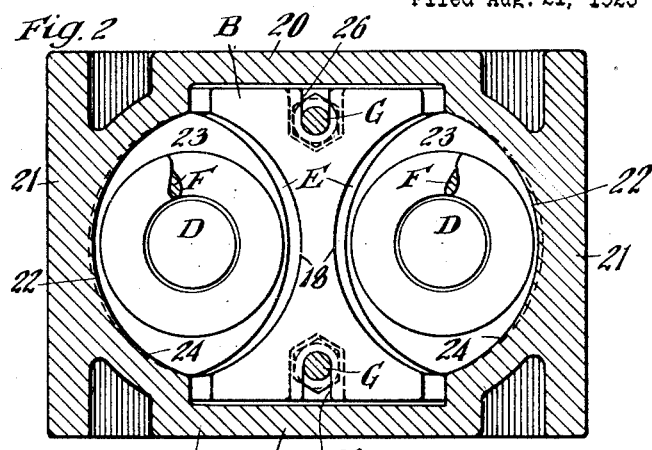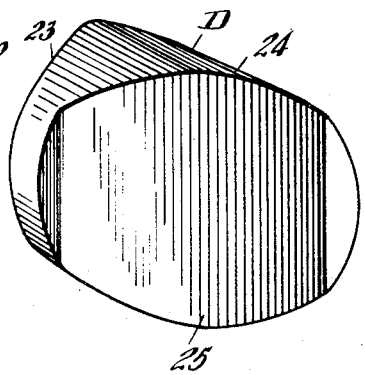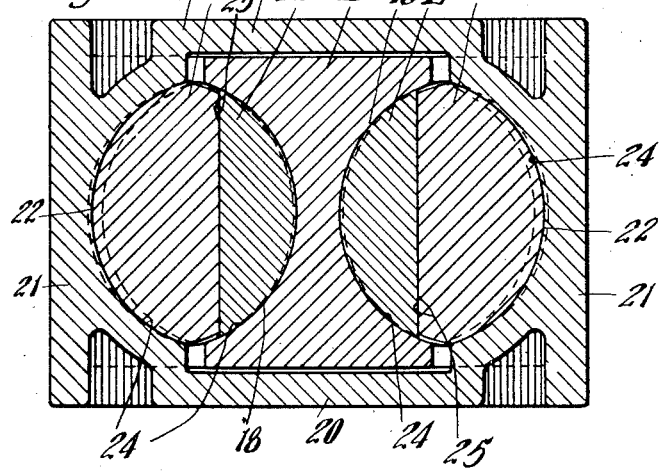

1,637,149

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 21, 1925. Serial No. 51,602.

This invention relates to improvements in friction shock absorbing mechanisms.

One object of the invention is to provide a friction shock absorbing mechanism adapted for railway draft riggings having high capacity and certain release, including a plurality of co-operating friction elements providing friction surfaces, the effective area of which is exceptionally large.

Another object of the invention is to provide a friction shock absorbing mechanism employing a pair of casings, a friction post, and spring resisted friction wedge shoes having wedging engagement with each other, wherein the friction shoes co-operate with friction surfaces on one of the casings and friction surfaces on the post.

Other objects and advantages of the invention will more fully and clearly appear from the description and claims hereinafter following.

In the drawings forming a part of this specification, Figure 1 is a longitudinal, horizontal, sectional view of a portion of a railway draft rigging illustrating my improvements in connection therewith. Figures 2 and 3 are vertical, transverse, sectional views corresponding respectively to the lines 2—2 and 3—3 of Figure 1. And Figure 4 is a detailed, perspective view of a friction wedge shoe used in connection with my improved mechanism.

In said drawings, 10—10 indicate channel-shaped center or draft sills of a railway car underframe, to the inner surfaces of which are secured front stop lugs 11—11 and rear stop lugs 12—12. The inner end of the drawbar is indicated by 13, to which is operatively connected a hooded yoke 14 of well-known form. The shock absorbing mechanism proper as well as a front main follower 15 is supported within the yoke. The yoke and the parts therewithin are operatively supported by a detachable saddle plate 16 fixed to the draft sills.

The improved shock absorbing mechanism proper, as herein shown, comprises broadly: a follower shell A; a friction post B; a friction shell C; two outer friction wedge shoes D—D; two inner friction wedge shoes E—E; front and rear pairs of twin arranged spring resistance elements F—F; and a pair of retainer bolts G—G.

The follower shell A is in the form of a substantially rectangular box-like casting having a transverse end wall 17 adapted to co-operate with the stop lugs 12 in the manner of the usual rear follower. The shell A is provided with spaced, horizontally disposed top, bottom and side walls, as most clearly shown in Figure 1.

The friction post B is formed integral with the transverse end wall 17 of the shell A and projects forwardly therefrom. The post is in the form of a relatively heavy elongated member having top and bottom strengthening webs formed integral with the follower shell A. At opposite sides, the post B is provided with a pair of longitudinally disposed friction surfaces 18—18, converging forwardly of the mechanism. The friction surfaces 18 as shown are preferably curved and correspond to a section of a true cylindrical surface.

The friction shell C is also in the form of a substantially rectangular box-like casting having a transverse front end wall 19, horizontally disposed spaced top and bottom walls 20—20 and vertically disposed spaced side walls 21—21. The end wall 19 bears directly on the front main follower 15 which in turn co-operates with the front stop lugs 11. Each of the side walls 21 is provided with a longitudinally extending curved interior friction surface 22. The friction surfaces 22 at the opposite sides of the shell diverge rearwardly of the mechanism and each surface corresponds to a section of a true cylindrical surface.

As most clearly shown in Figures 1 and 3, the friction shoes D are arranged at opposite sides of the mechanism and co-operate with the friction shell while the friction shoes E are on opposite sides of and in engagement with the friction post B. The four shoes D, D, E and E are all of like construction and are interchangeable. Each friction shoe as most clearly shown in Figure 4, is in the form of a heavy block having a transverse end face 23 adapted to form an abutment for one end of one of the spring resistance elements F, a curved longitudinally extending true cylindrical friction surface 24 on one side, and a flat wedge face 25 on the opposite side thereof. As clearly shown in the drawings, the side of the friction shoe carrying the wedge face 25 is also cut away on a curve to provide clearance for the corresponding friction surface of the co-operating friction element. The friction surfaces of the friction shoes D cooperate respectively with the friction surfaces 22 of the shell C and the friction surfaces 24 of the inner set of shoes E co-operate respectively with the friction surfaces 18 of the friction post B. The wedge faces of the shoes E on opposite sides of the mechanism co-operate with the wedge faces 25 of the shoes D. the shoes D and E being reversely arranged as shown. Each of the shoes is also provided with a central boss at the inner end thereof adapted to extend within the corresponding spring resistance element F to properly center the same.
The spring resistance elements are arranged in pairs at opposite ends of the mechanism, each pair consisting of two relatively heavy coils. The front and rear pairs of spring resistance elements are preferably of substantially the same capacity.

The parts are held in assembled relation and the over-all length of the mechanism is maintained by the pair of retainer bolts G—G. The two retainer bolts G and G are disposed respectively at the top and bottom of the gear, each bolt having its front end anchored to the wall 19 of the friction shell A and its rear end anchored to the front end of the friction post B, the post B being slotted at the top and bottom sides as indicated at 26—26 in Figure 2, the slots being open at their top and bottom sides and enlarged at their inner ends to provide recesses adapted to receive the heads of the bolts, the walls of said recesses being so designed as to prevent the bolts from turning. The retainer bolts, in addition to holding the parts assembled and of uniform overall length, also serve to maintain the spring resistance elements F under initial compression, thereby compensating for wear of the various friction and wedge faces. In full release position of the parts, the front end of the post is spaced from the end wall of the shell C a distance equal to the spacing between the inner ends of the shells A and C, so that upon full compression the post will be engaged by said end wall at the same time that the shells engage, to provide great column strength.

Assuming a compression stroke of the mechanism, the friction shell C and the follower shell A will be moved relatively toward each other, forcing the friction shoes toward each other through the medium of the interposed spring resistance elements. A wedging action will thus be set up between the friction shoes and the shoes will also be carried inwardly and slide longitudinally on the friction post B during the compression of the mechanism. During this action, friction will be created between the shoes D and the friction surface of the shell C on which they slide and between the shoes E and the friction surfaces of the post, thereby greatly augmenting the resistance offered. This action will continue either until the actuating force is reduced, or the friction shell C comes into engagement with the follower shell A, and the front end of the post is engaged by the end wall of the shell C, whereupon the actuating force will be transmitted directly through the follower shell, the friction shell and post to the corresponding stop lugs, relieving the springs from excessive strain. It will be evident that there will also be a differential movement between the shoes D and E on the wedging faces 25 during compression of the mechanism. When the actuating pressure is reduced. the springs will effectively restore all of the parts to normal position, outward movement of the friction shell C with reference to the follower shell A being limited by the retainer bolts G as hereinbefore pointed out.

While I have herein shown and described what I now consider the preferred manner of carrying out my invention. the same is merely illustrative, and I contemplate all changes and modifications that come within the scope of the claims appended hereto.

I claim:

1. In a friction shock absorbing mechanism, the combination with a pair of relatively movable shells. one of said shells having interior curved friction surfaces and the other having a fixed friction element thereon disposed centrally of the mechanism; of a set of friction elements co-acting with said interior friction surfaces; a second set of friction elements co-acting with said central element, said sets of friction elements having co-acting wedge faces; and a spring resistance element co-operating with each set of friction elements.

2. In a friction shock absorbing mechanism, the combination with a pair of relatively movable casings, one of said casings having interior inwardly converging true cylindrical friction surfaces, and the other having a friction post formed integral therewith, said post having curved friction surfaces on the opposite sides thereof disposed longitudinally of the mechanism; of a set of friction elements co-acting with said interior friction surfaces; a second set of friction elements co-acting with the friction surfaces of said post, said two sets having wedging engagement with each other; and a spring resistance opposing movement of each set of friction elements.

3. In a friction shock absorbing mechanism, the combination with a pair of relatively movable shells, one of said shells having interior, longitudinally disposed friction surfaces, and the other shell carrying a friction post having longitudinally disposed friction surfaces; a set of friction shoes co-operating with the friction surfaces of the shell; a second set of friction shoes co-operating with the post, said shoes having co-acting wedge faces; and twin arranged spring resistance elements co-operating with each set of friction shoes.

4. In a friction shock absorbing mechanism, the combination with a friction shell having opposed, interior inwardly diverging friction surfaces; of a casing having a tapered friction post thereon provided with friction surfaces on the opposite sides thereof; a pair of friction shoes co-operating with the friction surfaces of the shell; a second pair of friction shoes co-operating with the friction surfaces of the post, said first and second pair of shoes having co-acting wedge faces; and spring resistance elements co-operating with each pair of friction shoes.

5. In a friction shock absorbing mechanism, the combination with a friction shell having interior friction surfaces the opposite sides thereof, each disposed at an inclination to the longitudinal axis of the mechanism; a casing carrying a friction post, said post having friction surfaces on the opposite sides thereof, the surfaces on each side being parallel to the shell friction surfaces at the corresponding side of the mechanism, said shell and casing being relatively movable toward and away from each other; twin arranged spring resistance elements within said casing; twin arranged spring resistance elements within said shell; friction shoes co-operating with the friction surfaces of said shell and bearing on the corresponding twin arranged springs; and friction shoes co-operating with the post friction surfaces and bearing on the spring associated with the casing.

6. In a friction shock absorbing mechanism, the combination with two relatively movable shells, one of said shells having interior friction surfaces, and the other shell being provided with a friction post; a plurality of like, interchangeable friction shoes, said shoes comprising two pairs, one shoe of each pair co-operating with the friction shell; and the other shoe of each pair co-operating with the post, said shoes of each pair having co-acting wedge faces; and spring resistance means co-operating with all of said shoes.

In witness that I claim the foregoing I have hereunto subscribed my name this 19th day of August, 1925.

STACY B. HASELTINE.